July 17, 1956
A. TIVOLI
2,755,075
CARBURETTING EQUIPMENT
Filed Oct. 20, 1953
2 Sheets-Sheet 1
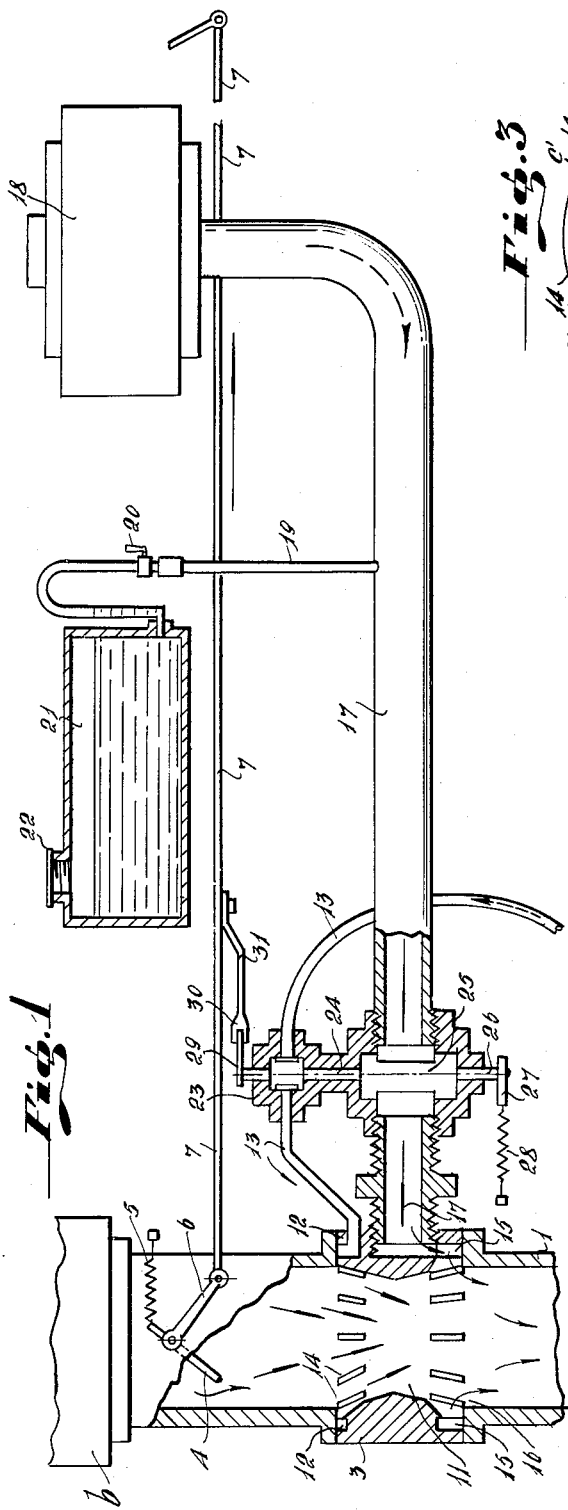
INVENTOR.
ALBERTO TIVOLI
BY
Michael S. Striker
agt.

July 17, 1956  A. TIVOLI  2,755,075
CARBURETTING EQUIPMENT

Filed Oct. 20, 1953  2 Sheets-Sheet 2

INVENTOR.
ALBERTO TIVOLI
BY
Michael S. Striker
agt.

United States Patent Office 2,755,075
Patented July 17, 1956

2,755,075

CARBURETTING EQUIPMENT

Alberto Tivoli, Buenos Aires, Argentina

Application October 20, 1953, Serial No. 387,247

5 Claims. (Cl. 261—16)

The present invention refers to a carburetting equipment for internal combustion motors and more particularly to an auxiliary device for atomizing of fuel, which device operates by injection of forced air to the static air, and which constitutes an improvement in that type of motive engine, resulting in maximum utilization of the applied fuel.

Carburetors of internal combustion motors, of known construction have formed mixtures which have been classified as excellent, but so far it has not been possible to avoid that fuel particles, of relatively large dimensions, are also carried into the cylinders which are not wholly consumed, so much so that they leave in the chambers certain residues of hydrocarbides which later are formed into coke, and remain adhered to the walls, with the consequent inconveniences, which are especially evident when the carbon is deposited in the ignition zone and prevents proper spark formation.

This signifies that the lack of carburation can cause inconveniences in the motor members, apart from the uneconomical results produced by the incomplete utilization of fuel.

Experiments have proven that not only is it necessary to increase the volume of air, but also provide such air under pressure, so that apart from establishing an expansion zone for the fuel particles which come forth from the suspension area of the carburetor, a mechanical action is also produced, which is able to reduce the size of these particles so as to convert the same into properly dissipated small droplets.

The device comprises, in the first place, an air feeder which, located between the manifold admission tube and the carburator outlet, and which provides a quantity of compressed air with sufficient pressure which, when projected in the current of the fuel mixture, subdivides the large fuel particles and converts the whole into properly dissipated small droplets, which are considered as ideal as carburating quality.

In order to achieve this result, the feeder is constituted by a device which is located between the couplings of the intake tube and the carburetor, in such a manner that it forms an integral part of the conduit which leads to the cylinders, and is provided with two corresponding connections to an air channel supplying air under atmospheric pressure and a compressed air channel leading from a compressor or other appropriate means into the device; by means of the accelerator pedal, operatively connected to a pair of valves, the passage through both fluid channels may be opened simultaneously, whilst at the same time the carburetor provides the primary mixture.

The device provided for the breaking up of large particles coming from the carburetor operates on the venturi principle, the air jets from a distributor form a current, increasing in velocity as it passes through the throat, and the fuel mixture is impacted while expanding in the enlarged zone of the device connected to air under atmospheric pressure; this means that the conditioning of the fuel mixture is practically perfect so that when reaching the cylinder the fuel is totally consumed without leaving residues.

One of the objects of the present invention is to reduce the feeding of the carburetor, thus allowing it to operate with a minimum fuel consumption for the same work of the motor, which results in a considerable economy.

Another object is to assure good running order of the motor, without surprises due to the lack of sparks or other flaws, by completely burning the fuel through recarburation and by elimination of all practically perturbing elements in the form of carbon or of condensates which may enter the lubrication system with the consequent danger of cutting the oil.

A further object of the invention is that of obtaining the highest utilization of the fuel.

Another object is that of being able to recarburate the fuel with the same yield, either in high or low velocity.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partly sectioned view of the essential elements of the recarburating equipment.

Fig. 2 is a top view of the feeder shown in Fig. 1.

Fig. 3 is a persective view of the feeding device, and finally.

In the different figures the same reference numerals indicate equal or corresponding parts, the various elements being indicated by letters.

Figure 4:
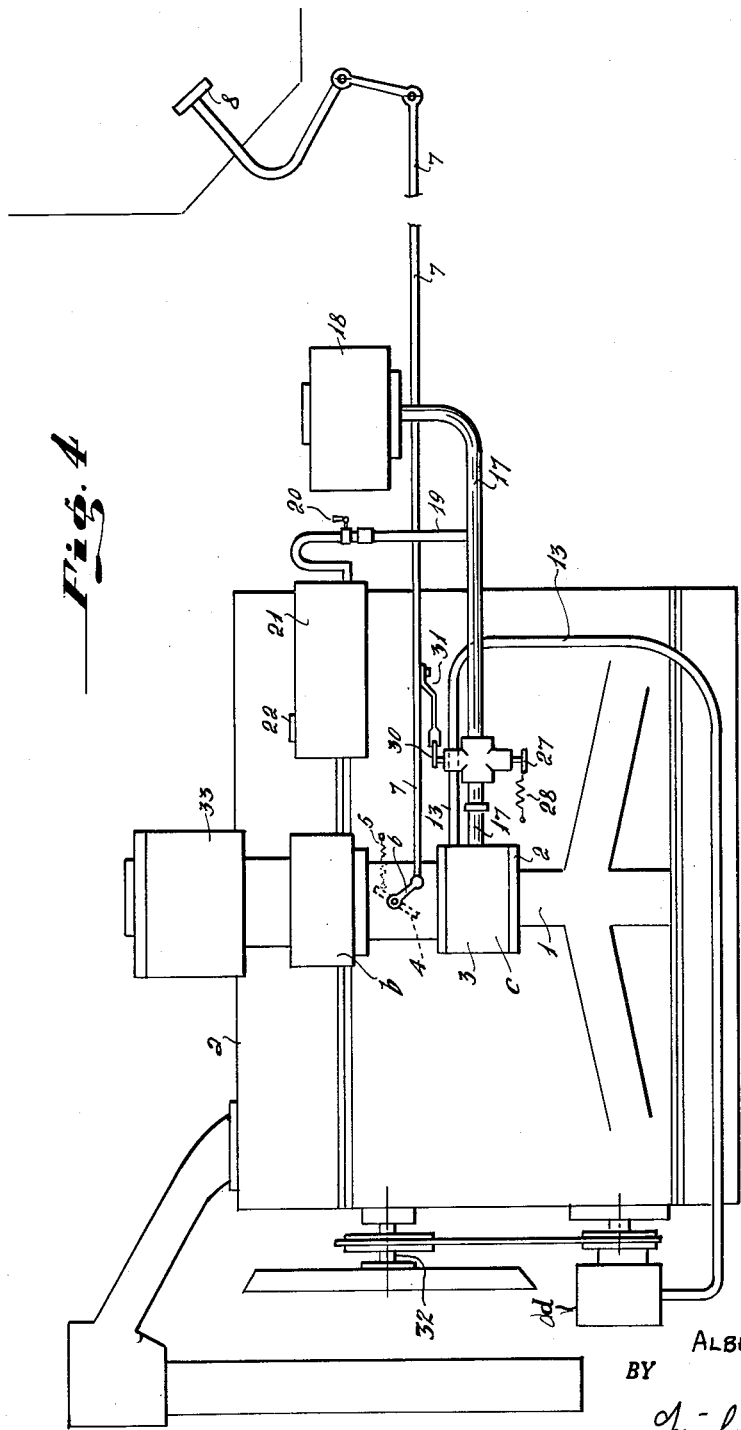
Fig. 4 is a schematic side view of an internal combustion motor to which the recarburating device has been applied.

As may be seen in the drawings, $a$ is the motor, the manifold 1 of which has its coupling 2 for joining to coupling 3 of carburetor $b$, but in this case, a feeder $c$ which is the principal element of the recarburating equipment, is interposed between the couplings 2 and 3.

The feeding device $c$ is located downstream of the outlet tube of the carburator $b$ in which the butterfly valve 4 is fixed, which is biased towards a closed position by spring 5, and which is coupled through arm 6 and rod 7 to the accelerating pedal 8.

The feeding device or venturi tube $c$ is constituted by a pair of couplings 2 and 3 and these are connected together by pins 10 passing through bores 9 from one coupling to the other.

The part 3 of the feeding device $c$ located between the discharge tube of the carburetor $b$ and the intake conduit of the manifold 1 is built in form of a venturi tube. This venturi tube 3 has an upstream end portion engaging the discharge conduit of the carburetor $b$ and a downstream end portion engaging the intake conduit of the manifold 1, whereby a fluid may flow continuously from the carburetor $b$ through the discharge conduit of the same and the venturi tube 3 into the intake conduit of the manifold 1. The venturi tube 3 is formed at the upstream portion with an annular passage 12 and with a plurality of openings or slots 14 distributed about the axis of the tube 3 and communicating with the passage 12 and the interior $c'$ of the venturi tube. The venturi tube 3 is formed at its downstream end portion with an annular passage 15 and a plurality of openings or slots 16 distributed about the axis of the tube 3 and communicating with the passage 15 and the interior of the venturi tube. The upstream end portion of the venturi tube is tapered so as to form a narrow throat 11 at the center of the tube as can clearly be seen from Fig. 1. The annular passage 12 is connected by means of the conduit 13 to the compressor $d$ driven by the motor. The annular passage 15 of the downstream end portion of the venturi tube 3 is connected by means of the conduit 17 with the air intake 18. A tube 19 communicates at one end with the conduit 17 and at the other end with the bottom of a water tank 21. The inlet of the water tank is usually closed by a lid 22. A hand-operated valve 20 is located in the tube 19 to close the passage through the tube.

In tube 13 is located a valve 23 which has a shaft 24 connecting it to valve 25 located in conduit 17 serving to feed air under atmospheric pressure into the venturi tube; the two movable bodies of valves 23 and 25, apart from being united in tanden form by the shaft 24, are, on one hand, turned to a closed position by means of spring 28 and the arm 27 fixed to the end 26 of the shaft 24, and on the other hand they are turned to an open position by means of an arm 30 which is fixed at one end to the portion 29 of the shaft 24 and at the other end to a link 31, connecting the arm 30 to rod 7 of the accelerator. With this connection the air feeding valves are synchronized with the operation of butterfly valve 4 of the carburetor $b$. Therefore, by pressing pedal 8, butterfly valve 4 and valves 23 and 25 are simultaneously opened.

The compressor $d$ has its movable element coupled to a shaft 32 which may be an extension of any of the shafts driven from motor $a$; due to that fact, the compressor $d$ is operated and provides the compressed air which through tube 13 reaches the feeder $c$ whenever the motor is started.

Operation

Normally, the tension of springs 5 and 28 keeps the butterfly valve 4 and valves 23 and 25 closed.

When in operation, the motor pistons produce a suction action, creating a vacuum in manifold 1.

When the pedal 8 is depressed the buttefly valve 4 and valves 23 and 25 are opened. The fuel is then conditioned in the carburetor converting it into a mixture of fuel and air coming from intake 33; this mixture, attracted by the aspiration of the pistons, is directed towards manifold 1; but as at the same time valves 23 and 25 are opened, it receives when entering cavity $c'$ a plurality of spurts of compressed air admitted through the openings distributed throughout channel 12. This air, coming from compressor $d$ through conduit tube 13, has a volume proportioned to the opening of valve 23, concurring with the opening of butterfly valve 4. With the concurring action of the spurts of air, any large fuel particles, which accompany the mixture, are reduced in such a manner so as to be converted into minute droplets, immediately finding air for their suspension, since in passing through the throat 11, and increasing the velocity, additional air provided by openings 16 is fed into the mixture; thus, with the recarburation the mixture arrives in perfect condition and is completely consumed when ignited in the cylinder chamber by the spark from the spark plug.

The air under atmospheric pressure received in the lower part of the feeding device $c$ is regulated in accordance with the compressed air, and corresponding to the mixture proportioned by carburetor $b$, since, as has been stated, valve 25 is synchronized in tandem form with valve 23. As the air from the intake 18 passes through conduit 17 it produces in the tube 19a suction action and according to the position of valve 20, a certain quantity of water is drawn from tank 21, so that a humidification of the air in conduit 17 is obtained in sufficient proportion in order to help the combustion of the components of the fuel mixture.

Accelerating the car by pressing on pedal 8, not only increases the flow of gas by changing the position of valve 4, but it also increases the flow of compressed air through valve 23 and the flow of air through valve 25 which means that the system responds in the same manner into all velocities.

When pedal 8 is freed, the springs return the whole system to an inoperative position spring 5 closes valve 4 and spring 28 induces the closing of the two valves 23 and 25.

Since the recarburated fuel renders a greater yield, the carburetor $b$ can be throttled so as to supply only the absolute minimum of gas necessary for the required work.

It is obvious that in carrying out the invention, modifications of detail in the structure of the specified device may be introduced, without implying a departure from the scope of said invention, the characteristics of which are clearly defined in the following claims.

I claim:

1. In an internal combustion engine, in combination, a carburetor having a discharge conduit; an intake manifold having an intake conduit; a venturi tube located between said discharge conduit and intake conduit, having an upstream end portion engaging said discharge conduit, and having a downstream end portion engaging said intake conduit, whereby a fluid may flow continuously from said carburetor through said discharge conduit thereof and said venturi tube into said intake conduit of said manifold, said venturi tube being formed at its upstream end portion with an upstream passage means communicating with the interior of said tube and at its downstream end portion with a downstream passage means also communicating with the interior of said tube; means communicating with said upstream passage means for supplying thereto air at higher than atmospheric pressure; and means communicating with said downstream passage means for supplying thereto air at atmospheric pressure, so that any insufficiently dissipated fuel droplets in the mixture upstream of the throat of the venturi tube may become further dissipated in the air supplied through said downstream passage means.

2. In an internal combustion engine, in combination, a carburetor having a discharge conduit; an intake manifold having an intake conduit; a Venturi tube located between said discharge conduit and intake conduit, having an upstream end portion engaging said discharge conduit, and having a downstream end portion engaging said intake conduit, whereby a fluid may flow continuously from said carburetor through said discharge conduit thereof and said Venturi tube into said intake conduit of said manifold, said Venturi tube being formed at its upstream end portion with an upstream passage means communicating with the interior of said tube and at its downstream end portion with a downstream passage means also communicating with the interior of said tube; a third conduit communicating with said upstream passage means; a compressor communicating with said third conduit for supplying thereto air at higher than atmospheric pressure to be fed into said Venturi tube through said upstream passage means thereof; a fourth conduit communicating with said downstream passage means and having distant from the latter an inlet end communicating with the atmosphere for supplying air at atmospheric pressure through said downstream passage means, so that any insufficiently dissipated fuel droplets in the mixture upstream of the throat of the Venturi tube may become further dissipated in the air supplied through said downstream passage means.

3. In an internal combustion engine, in combination, a carburetor having a discharge conduit; a throttle valve located in said discharge conduit; an intake manifold having an intake conduit; a Venturi tube located between said discharge conduit and intake conduit, having an upstream end portion engaging said discharge conduit, and having a downstream end portion engaging said intake conduit, whereby a fluid may flow continuously from said carburetor through said discharge conduit thereof and said Venturi tube into said intake conduit of said manifold, said Venturi tube being formed at its upstream end portion with an upstream passage means communicating with the interior of said tube and at its downstream end portion with a downstream passage means also communicating with the interior of said tube; a third conduit communicating with said upstream passage means; a compressor communicating with said third conduit for supplying thereto air at higher than atmospheric pressure to be fed into said Venturi tube through said upstream passage means thereof; a fourth conduit communicating with said downstream passage means and having distant from the latter an inlet end communicating with the atmosphere for supplying air at atmospheric pressure through said downstream passage means, so that any insufficiently dissipated fuel droplets in the mixture upstream of the throat of the Venturi tube may become further dissipated in the air supplied through said downstream passage means; control means operatively connected to said throttle valve for controlling the same; and a pair of valves respectively located in said third and fourth conduits for controlling the flow of air therethrough, said valves being connected together for operation together and one of said valves being operatively connected to said control means to be controlled thereby so that operation of said control means simultaneously controls said carburetor and said valves.

4. In an internal combustion engine, in combination, a carburetor having a discharge conduit; an intake manifold having an intake conduit; a Venturi tube located between said discharge conduit and intake conduit, having an upstream end portion engaging said discharge conduit, and having a downstream end portion engaging said intake conduit, whereby a fluid may flow continuously from said carburetor through said discharge conduit thereof and said Venturi tube into said intake conduit of said manifold, said Venturi tube being formed at its upstream end portion with an upstream passage means communicating with the interior of said tube and at its downstream end portion with a downstream passage means also communicating with the interior of said tube; a third conduit communicating with said upstream passage means; a compressor communicating with said third conduit for supplying thereto air at higher than atmospheric pressure to be fed into said Venturi tube through said upstream passage means thereof; a fourth conduit communicating with said downstream passage means and having distant from the latter an inlet end communicating with the atmosphere for supplying air at atmospheric pressure through said downstream passage means, so that any insufficiently dissipated fuel droplets in the mixture upstream of the throat of the Venturi tube may become further dissipated in the air supplied through said downstream passage means; a fifth conduit communicating with said fourth conduit; a water tank communicating with said fifth conduit; and a valve in said fifth conduit for controlling the flow of fluid therethrough, whereby the humidity of the air flowing through said downstream passage means may be controlled.

5. In an internal combustion engine, in combination, a carburetor having a discharge conduit; an intake manifold having an intake conduit; a Venturi tube located between said discharge conduit and intake conduit, having an upstream end portion engaging said discharge conduit, and having a downstream end portion engaging said intake conduit, whereby a fluid may flow continuously from said carburetor through said discharge conduit thereof and said Venturi tube into said intake conduit of said manifold, said Venturi tube being formed at said upstream end portion thereof with an annular passage and with a plurality of openings distributed about the axis of said tube and communicating with said passage and with the interior of said tube, and said Venturi tube being formed at said downstream end portion thereof with an annular passage and with a plurality of openings distributed about the axis of said tube and communicating with said latter passage and with the interior of said tube; means communicating with said annular passage at said upstream end portion of said tube for supplying air at higher than atmospheric pressure thereto; and means communicating with said annular passage at said downstream end portion of said tube for supplying air at atmospheric pressure thereto.

References Cited in the file of this patent

UNITED STATES PATENTS

| 1,901,810 | Heide | Mar. 14, 1933 |
| 1,905,159 | Davidson | Apr. 25, 1933 |
| 2,012,564 | Holmes | Aug. 27, 1935 |
| 2,087,116 | Prentiss | July 13, 1937 |
| 2,642,852 | Bester | June 23, 1953 |